United States Patent [19]

Mondello

[11] 4,156,104
[45] May 22, 1979

[54] SUBMARINE CABLE FOR OPTICAL COMMUNICATIONS

[75] Inventor: Richard C. Mondello, Middletown Township, Monmouth County, N.J.

[73] Assignee: Bell Telephone Laboratories, Incorporated, Murray Hill, N.J.

[21] Appl. No.: 840,596

[22] Filed: Oct. 11, 1977

[51] Int. Cl.² .............................................. G02B 5/14
[52] U.S. Cl. .............................. 174/70 R; 174/106 R; 174/131 R; 350/96.23
[58] Field of Search ............ 174/70 R, 131 A, 131 R, 174/106 R, 70 R; 350/96 B, 96.23

[56] References Cited

U.S. PATENT DOCUMENTS

| | | | |
|---|---|---|---|
| 3,264,404 | 8/1966 | Trebby et al. | 174/131 R |
| 3,328,874 | 7/1967 | Davis et al. | 174/106 |
| 3,717,720 | 2/1973 | Snellman | 174/131 A |
| 3,887,265 | 6/1975 | Margolis et al. | 174/70 R |
| 4,037,923 | 7/1977 | Beal | 350/96.23 |

FOREIGN PATENT DOCUMENTS

| | | | |
|---|---|---|---|
| 2430857 | 1/1975 | Fed. Rep. of Germany | 350/96.23 |
| 2449439 | 4/1976 | Fed. Rep. of Germany | 350/96 B |
| 2265108 | 10/1975 | France | 350/96.23 |
| 2275002 | 1/1976 | France | 174/70 R |

*Primary Examiner*—Laramie E. Askin
*Assistant Examiner*—E. F. Borchelt
*Attorney, Agent, or Firm*—Burton I. Levine; Stephen M. Gurey; Sylvan Sherman

[57] ABSTRACT

A repeatered submarine cable has a composite inner conductor for accommodating a system of optical fibers therein. The cable strength members include a central elongated filament and plural layers of stranded steel wires separated from the central filament by an annular insulating core member, in which the optical fibers are embedded. A metallic tubular jacket surrounds the stranded steel layers to provide both a DC path for powering the optical repeaters and a hermetic moisture barrier for the fibers.

7 Claims, 2 Drawing Figures

SUBMARINE CABLE FOR OPTICAL COMMUNICATIONS

BACKGROUND OF THE INVENTION

The invention relates to submarine cables and, more particularly, to repeatered submarine cables adapted for broadband communication.

The well-known broadband characteristics of optical fibers, together with the relatively few repeaters per given distance which they require in a transmission system of significant length, make such fibers a prime candidate for intercontinental and other undersea communications. This, of course, requires the incorporation of the fiber system into a submarine cable.

One major problem inhibiting the use of optical fibers in a submarine cable is the necessity of hermetic protection of the fibers against moisture. This is particularly significant because of the mechanical stresses on a submarine cable during laying and recovery, since the combination of moisture and stress on an optical fiber has been found to quickly lead to structural failure. Moreover, a fiber-bearing cable must provide an efficient DC path for powering the optical repeaters in the system and must be sufficiently strong to withstand the above-mentioned stresses and years of operation at sea.

The reconciliation of these requirements in a single submarine cable has up to now been elusive. For example, while certain manufacturers presently offer multielement optical fiber arrays which are arranged in cable form (including strength members and packing), such designs cannot reliably withstand the pressures and stresses of operation at sea, nor are they sufficiently waterproof to prevent deleterious moisture penetration to the fibers.

SUMMARY OF THE INVENTION

These problems are simultaneously solved with the use of an optical fiber-containing submarine cable constructed in accordance with the invention.

In an illustrative embodiment, the cable includes a two-part strength member system having a first central strength-imparting filament and a plurality of second stranded steel wires. The second wires are radially separated from the central filament by an annular insulating core member. One or more optical fibers are embedded within the core member around the central steel wire.

As a feature of the invention, a non-porous tubular conductive moisture barrier, illustratively an aluminum or copper jacket, is disposed in surrounding contacting relation with at least some of the stranded steel wires. The moisture barrier serves also as a DC path for powering the optical repeaters associated with the cable.

An annular insulator formed, e.g., from polyethylene, surrounds the moisture barrier, and, if desired, an outer annular jacket of higher density polyethylene surrounds the last-mentioned insulator.

BRIEF DESCRIPTION OF THE DRAWING

The invention is further set forth in the following detailed description taken in conjunction with the appended drawing, in which.

DETAILED DESCRIPTION

Figure 1:
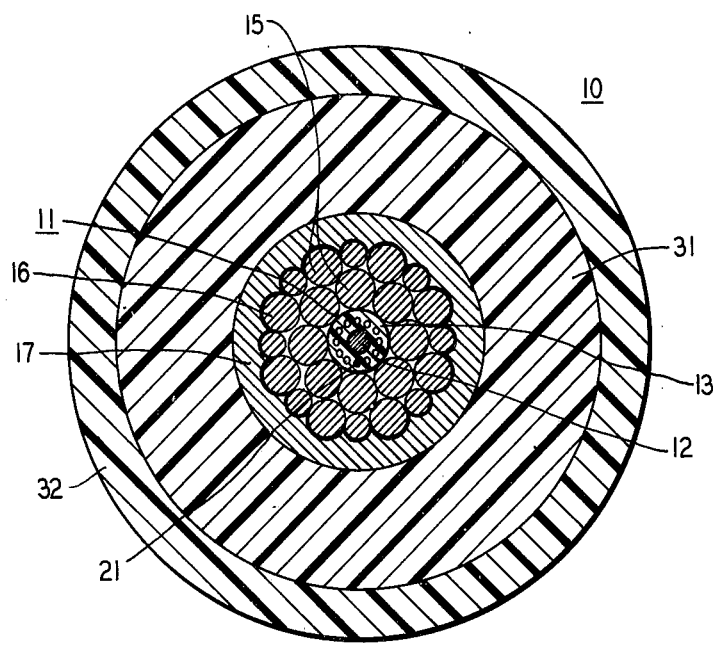
FIG. 1 is a cross-sectional view of one embodiment of an undersea fiberguide cable constructed in accordance with the invention.

Referring now to the drawing, FIG. 1 depicts a section 10 of a repeatered submarine cable constructed in accordance with the invention for the undersea transmission of optical waves. The cable core (designated 11) includes a first inner strength member 12 in the form of a central filament that is surrounded by and in contact with an annular insulating member 13, illustratively of a polyester elastomer supplied under the designation "HYTREL" by the Dupont Corporation. The filament 12 may be a conductive wire, such as copper or steel, or alternatively may be a high-strength dielectric material such as glass ribbon or the spun polymer supplied under the designation "KEVLAR" by the Dupont Corporation. If desired, the outer diameter of the core member 13 may be contacted by a protective sheath 14 (FIG. 2), illustratively of nylon or other relatively high melting point material.

A second outer strength member 15 (FIG. 1) of the cable is formed from a plurality of stranded steel wires 16 which are successively wrapped, in superposed layers as shown, around the outer diameter of the core 11. In particular, the stranded steel wires 16 in the outer strength member may be distributed into an 8-wire inner layer directly in contact with the core 11, and a 16-wire outer layer in contact with the inner layer.

To complete the composite inner conductor of the cable, a non-porous conductive jacket 17, as of aluminum or copper, is formed directly over the outer layer of stranded wires 16. In addition to forming an efficient DC conducting path for powering optical repeaters (not shown) spaced at intervals along the cable, such solid jacket serves as a low-cost and highly effective moisture barrier for the optical transmission lines disposed in the cable. The jacket 17 further provides a positive clamping action on the surrounded steel wires 16 of the outer strength member, preventing any unraveling of the stranded wires during handling, storage or operation. (Advantageously, in the case where the jacket 17 is of aluminum, the seam of the jacket may be formed by a solid-phase or other cold welding process.)

Figure 2:
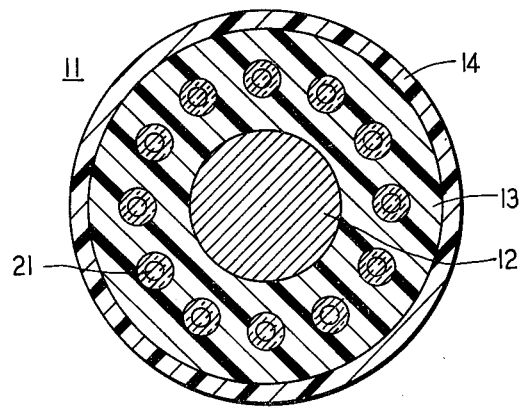
FIG. 2 is an enlarged cross-sectional view of the core region of the cable of FIG. 1.

As best shown in FIG. 2, the elastomeric portion 13 of the core 11 has embedded therein a plurality of conventional cladded glass-fiber optical transmission lines 21 (illustratively twelve in number). For ease of illustration, the lines 21 are shown distributed concentrically around the central filament 12; but it will be understood that any convenient distribution of the lines or even a single line may be employed within the portion 13.

As suggested above, the jacket 17 surrounding the steel wires 16 operates as a moisture barrier for the optical fibers 21 within the annular core member 13. This avoids the necessity of providing a separate outer moisture barrier.

A conventional annular polyethylene insulator 31 (FIG. 1) is formed over the outer diameter of the jacket 17. If desired for added toughness of the cable, a separate polyethylene jacket 32, of higher density than the insulator 31, may be formed over the insulator 31. Under ordinary circumstances, a separate metallic outer conductor can be dispensed with in favor of a sea return.

The use of a solid tubular moisture barrier surrounding and in contact with the steel wires 16 can provide still another advantage when the depicted cable section is terminated, at the associated optical repeater, in a so-called "gimbal-less" coupling or the like. In this type of coupling, the front end of the cable section is brought all the way up to the repeater without the necessity of exposing the stranded steel wires of the strength member. In such cases, since the moisture barrier of the present design is at the inner conductor, it is much simpler to maintain a continuous moisture shield into the repeater than in designs requiring a separate outer moisture barrier.

Without in any way affecting the generality of the foregoing description, Table I below presents typical sizes of the various elements of the undersea fiberguide cable 10:

TABLE I

| | |
|---|---|
| Diameter of central steel wire | 1.0 mm |
| Outer diameter of annular insulating core member | 2.563 mm |
| Outer diameter of optical fiber (uncoated) | 120 μm |
| Diameter of each stranded steel wire surrounding the annular insulating core member | 1.105–1.554 mm |
| Outer diameter of 8-wire inner layer of stranded steel wires | 5.671 mm |
| Outer diameter of 16-wire outer layer of stranded steel wires | 7.882 mm |
| Outer diameter of aluminum moisture barrier | 10.5 mm |
| Outer diameter of low-density polyethylene insulator | 21.0 mm |
| Outer diameter of high-density polyethylene jacket | 25.0 mm |

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an undersea cable:
   a first central strength member;
   an annular insulating core member formed from an elastomeric material surrounding and in contact with the first strength member;
   a plurality of second stranded strength members surrounding and in contact with the annular insulating core member;
   a non-porous moisture-proof conductive tube surrounding and in contact with at least a portion of the second strength members filling the interstices of the central outermost boundary of said second strength members, said conductive tube preventing the ingress of any moisture to said core member when said cable is in an undersea environment and being adapted for high power transmission; and
   at least one optical fiber totally embedded in the elastomeric material of a portion of the annular insulating core member.

2. Apparatus as defined in claim 1, in which the conductive tube is formed from aluminum.

3. Apparatus as defined in claim 1, in which the conductive tube is formed from copper.

4. Apparatus as defined in claim 1, in which a plurality of the optical fibers are disposed in mutually spaced relation in the annular insulating core member.

5. Apparatus as defined in claim 1, in which the second strength members comprise steel wires distributed in first and second substantially concentric layers around the outer diameter of the annular insulating core member.

6. Apparatus as defined in claim 1, further comprising a first low-density annular polyethylene body surrounding and in contact with the conductive tube.

7. Apparatus as defined in claim 6, further comprising a second high-density annular polyethylene body surrounding and in contact with the first body.

* * * * *